April 11, 1933. J. E. PERRAULT Re. 18,793

METHOD OF MANIPULATING MULTIPLE FASTENERS

Original Filed Sept. 15, 1926 3 Sheets-Sheet 1

INVENTOR.
Joseph E. Perrault
BY R. S. Kelley
ATTORNEY.

April 11, 1933. J. E. PERRAULT Re. 18,793
METHOD OF MANIPULATING MULTIPLE FASTENERS
Original Filed Sept. 15, 1926 3 Sheets-Sheet 2
Fig.4.
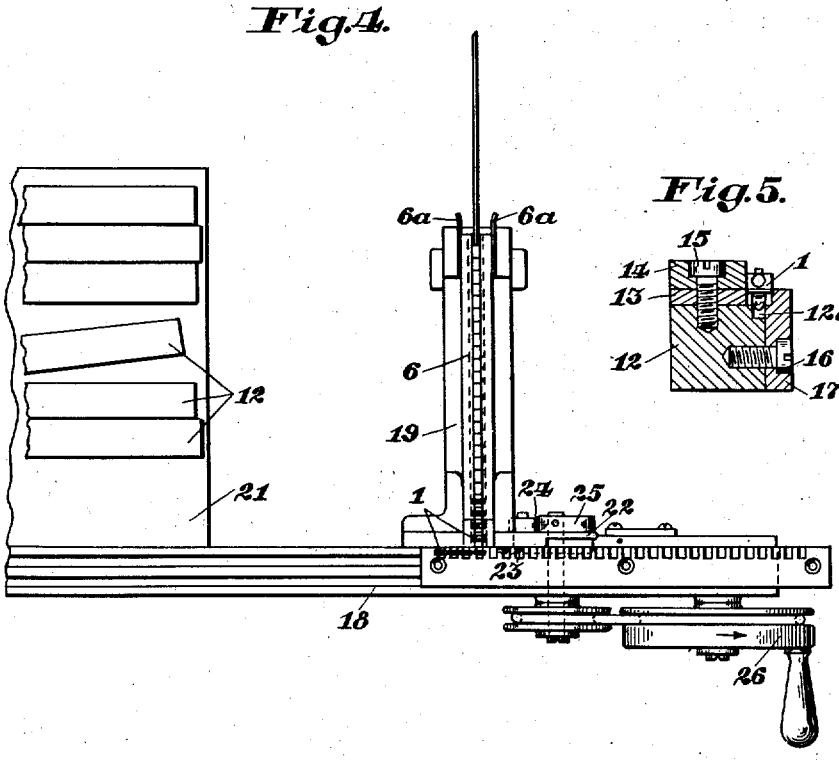
Fig.5.
Fig.6.
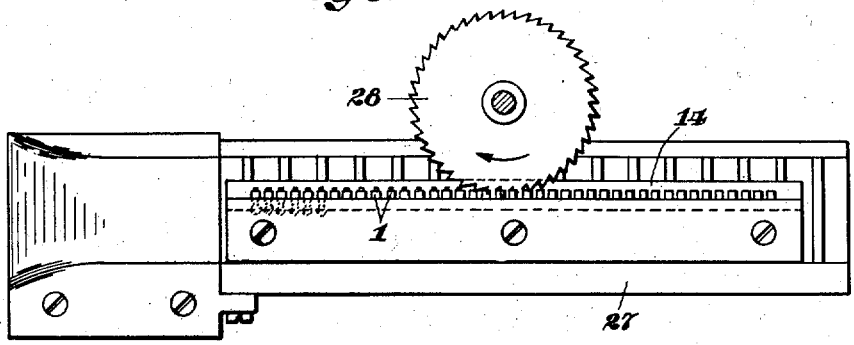
INVENTOR.
Joseph E. Perrault
BY R. S. Kelly.
ATTORNEY.

April 11, 1933. J. E. PERRAULT Re. 18,793

METHOD OF MANIPULATING MULTIPLE FASTENERS

Original Filed Sept. 15, 1926 3 Sheets-Sheet 3

INVENTOR.
Joseph E. Perrault
BY R. S. Kelley
ATTORNEY.

Reissued Apr. 11, 1933 Re. 18,793

UNITED STATES PATENT OFFICE

JOSEPH E. PERRAULT, OF WATERTOWN, MASSACHUSETTS, ASSIGNOR, BY MESNE ASSIGNMENTS, TO HOOKLESS FASTENER COMPANY, A CORPORATION OF PENNSYLVANIA

METHOD OF MANIPULATING MULTIPLE FASTENERS

Original No. 1,679,626, dated August 7, 1928, Serial No. 135,634, filed September 15, 1926. Application for reissue filed January 20, 1932. Serial No. 587,830.

My present invention relates to a method of and apparatus for manipulating multiple fastener elements of the type disclosed in Letters Patent of the United States #1,571,095 granted to the Hood Rubber Company as my assignee on the 26th day of January 1926.

In an application filed by me on the 2nd day of June 1926, #113,274, I have disclosed a method of and apparatus for making the male elements.

The male elements so produced require that their bases shall be slotted to receive the tapes and thereafter they must be threaded upon the tapes and clamped thereon.

The female fasteners are likewise manufactured with closed bases which require slotting before they can be assembled upon the tapes in the same manner.

As these elements are relatively small this presents quite a problem and the present invention aims to provide a method and means for rapidly, economically and efficiently performing these operations.

The invention includes the novel method and means hereinafter described and particularly defined by the appended claims.

In order that the invention may be better understood reference is made to the accompanying drawings in which:—

Fig. 4 is a plan view illustrating the means for and manner of transferring the fastener members from the carrier bar to the spacer bar.

Fig. 5 is a cross sectional detail view on a larger scale showing the spacer bar.

Fig. 6 is a plan view showing the cutting of the grooves or channels in the bases of the carrier elements.

In the present application I have illustrated and described my invention as applied to the manipulation of the male fastener elements as produced by the machine and method disclosed by my application #113,274 hereinbefore referred to but it will be obvious that it is applicable with certain minor changes, to manipulating the female fastener elements as well.

The fastener elements as produced by said machine are customarily made of brass and are first preferably subjected to a tumbling action in a suitable machine to smooth them up after which they are nickel plated. Such elements are indicated by the numeral 1 in the accompanying drawings.

Figure 1:
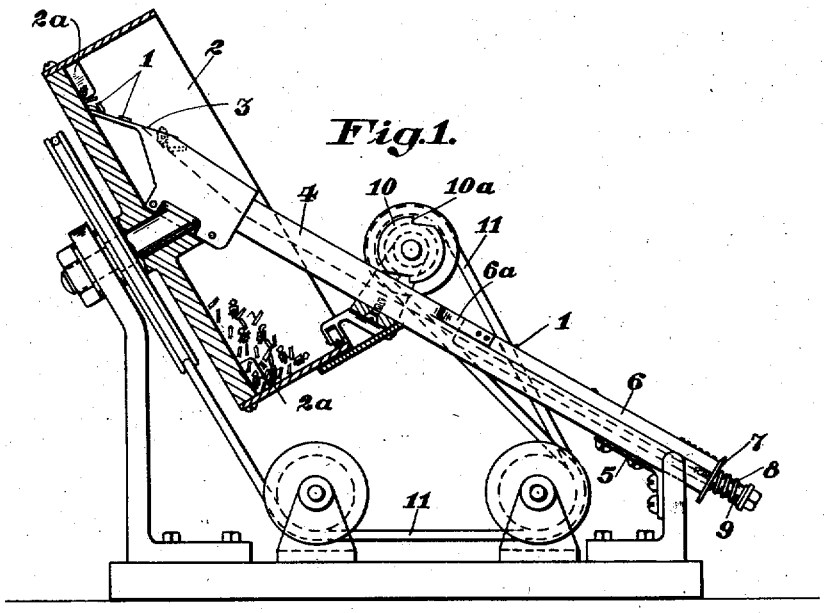
Figure 1 is an elevation, partly in section showing a device for assembling the elements upon a carrier or transfer bar or element.
Figure 2:
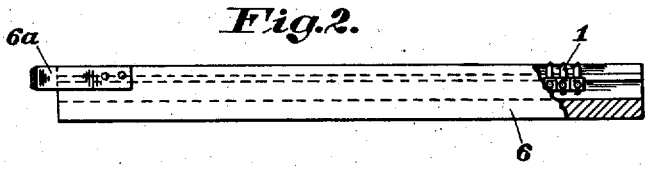
Fig. 2 is a detail view partly in side elevation and partly in section showing the carrier bar with a number of fastener elements in position therein.

These are placed in a receptacle 2 (Fig. 1) journaled to rotate about an inclined axis and being rotatable by hand or otherwise. Said receptacle is provided with a plurality of blades or projections $2^a$, which, as the receptacle rotates, elevate the fastener elements until they drop onto a deflector plate 3 which deflects and guides them to a chute 4 fast to deflector plate 3 and supported at its lower end by bracket 5. The lower portion (approximately half) of the chute is cut away or stepped to receive the initial assembling and transfer or carrier bar 6 provided with a channel corresponding approximately in shape to the shape of the fastener elements (Fig. 3), the chute 4 having a corresponding guide channel alined with the carrier or transfer bar when the latter is in the position shown in Fig. 1.

The carrier bar is removably supported by the cut away portion of the chute, conveniently by providing it at the upper end with opposed spring fingers $6^a$ which grip the opposite side faces of the chute (only one finger being shown) and by providing the lower end of the chute with a clamping plate 7 which serves to close the channel at the lower end of the carrier bar, and press the latter upwardly against the edge of the chute. Said plate 7 is acted on by a pair of springs 8 encircling screws 9 passing through openings in the presser plate and tapped into the end walls of the chute on each side of the carrier bar.

Figure 3:
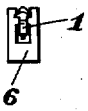
Fig. 3 is an end view of the carrier bar.

From the shape of the channel in Fig. 3 it will be readily observed that only those fasteners that are properly positioned, i. e. pointed side up, can enter the channel, and that any others would slide down the top of the chute. The depth of the channel is such that the pointed ends of the fasteners which are properly positioned do not project appreciably above the top of the channel.

To remove any others from the chute I provide a rotating wheel 10 driven by suitable means, such as belt 11 and the pulleys shown, from the rotating hopper, to rotate in the direction indicated by the arrow, such wheel having a grooved periphery to permit passage of the points of the elements, and having also abutments or shoulders 10[a] which will contact with misplaced elements and throw them back into the hopper.

The carrier or transfer bar having been loaded the next step is to transfer the elements to a spacing device whereby they will be spaced apart the distance they are to occupy when on the tape and which spacing bar is used for the manipulations leading up to and including the application to the tape.

Such spacing bar is shown in cross section in Fig. 5 and comprises a main bar 12 having a toothed or comb bar 13 secured to the upper face thereof by overlying plate 14 and tap screws 15. The spaces between the teeth are just sufficient to admit the fastener elements and the width of the teeth corresponds to the distance apart the elements are to be spaced when applied to the tape.

The bar 12 is of greater width than bar 14 as shown in Fig. 5 and has removably secured to the projected face thereof by suitable means such as tap screws 16, a plate 17 which forms a fastener receiving channel into which the teeth of the comb bar project transversely. Bar 12 has a rebate 12[a] which, with the face of plate 12 forms a point receiving channel.

For transferring the elements from the carrier bar to the spacing bar the plates 12, 14 and 17 are removed from the comb bar and the latter is placed on its side (in inverted position from that shown in Fig. 5) in a guide way 18 while a loaded carrier or transfer bar is placed in a guide way 19 arranged at right angles to guide way 18, and in the same horizontal plane, the spacing bar being arranged so that its toothed portion as it is moved in the guideway 18 will travel across the end of the carrier bar. If now the spacing bar is moved to the left, Fig. 4, and endwise pressure applied to the row of elements in the carrier bar channel, said elements will successively be inserted in the spaces between the teeth.

A table 21 is arranged convenient to the delivery end of guide way 18 to receive the filled spacing or comb bars.

While the movement of the spacing bar might be accomplished by a mere pushing operation, I prefer to provide the guide bar with a slide 22 carrying a pawl 23 adapted to engage the teeth of the comb bar and carrying also a roller 24 coacting with a cam 25 fast on a shaft journaled in suitable bearings in the guide and actuated by hand wheel 26 through the belt connections shown whereby the spacing bar is intermittently moved one space at a time.

After the spacing bar has been filled as above described the plates 14 and 17 are applied as shown in Fig. 5 thereby clamping the fastener elements in position with their bases uppermost, and they are ready to have said bases slotted which may be readily accomplished as shown conveniently in Fig. 6 by placing the spacing bar in a suitable guide 27 and moving it past a circular metal cutting saw 28 which may be driven in any suitable manner not necessary to be shown herein.

Figure 7:
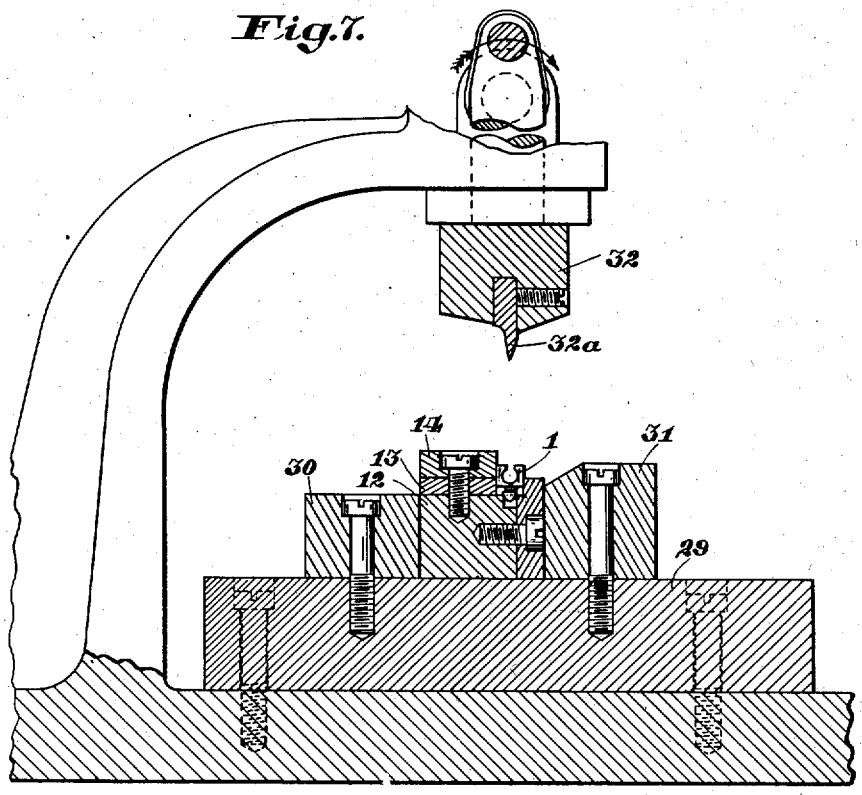
Fig. 7 is a view partly in elevation and partly in section showing the manner of and means for spreading the walls of the tape-receiving channels.

The saw cuts through the bases of the alined elements and intersects the transverse openings and completes the fastener element by providing it with the tape receiving slot such completed form being shown in Fig. 7. In this form the jaws formed by the slots need spreading apart that they may the more readily receive the tape.

While this spreading might be accomplished by hand I prefer to provide a press having its bed block or platen 29 provided with means for centering and holding the spacing bar such as bars 30 and 31, and a plunger 32 operated in the usual manner and provided with an opening wedge 32[a] having one face perpendicular and one face inclined so that the fasteners are spread towards one side only, this being necessary in connection with the particular shape of spacing block used as will be obvious.

Figure 9:
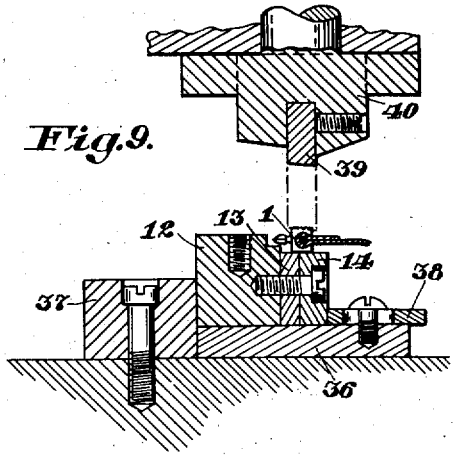
Fig. 9 is a sectional view illustrating the compressing of the channel walls on the tapes.
Figure 8:
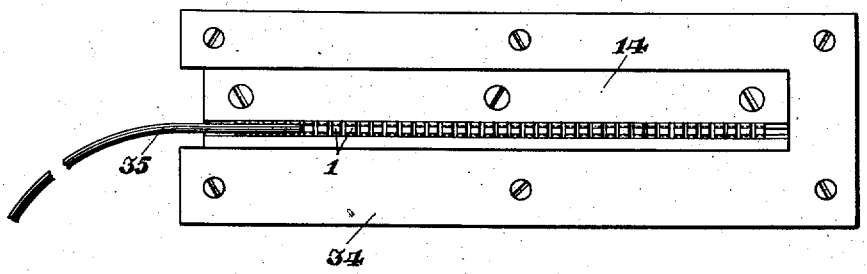
Fig. 8 is a plan view illustrating the manner of threading the tape in the fastener elements.

After the jaws have thus been spread apart the carrier tape may be readily inserted. This, as is well known to those skilled in the art, comprises a tape of suitable length having a beaded edge, usually formed by folding a tape about a cord. The spacing block is preferably removed from the press and placed in a holder 34 shown conventionally in Fig. 8 and the tape threaded through the spaced apart fasteners carried thereby with the bead lying in the openings and the edge of the tape projecting from the slots. The tape partially inserted is indicated at 35. After the tape has thus been inserted the only remaining operation prior to the application of the strip to the article of foot wear or other place of use, is to clamp the elements firmly on the tape. This is accomplished preferably by placing the spacing bar on its side in a press having its platen 36 provided with fixed and movable guides or abutments 37 and 38 respectively, (in Fig. 9) removing the plate 17 and subjecting the fasteners to the action of the presser member 39 carried by the press plunger 40.

The upper surface of the platen 36 is inclined slightly to a horizontal plane and the face of the presser member 39 is correspondingly but reversely inclined so that after the walls of the fastener members are compressed they incline towards each other and cooperate with the guides in the manner disclosed in my aforesaid patent. This inclination of the platen and die face further acts to facilitate the clamping action of the elements on the tape or stringer.

I claim:

1. The herein described method of manipulating multiple fastener elements of the type described which consists in cutting through the bases of the elements to form slots, widening the slots by a spreading action, inserting a carrier tape, and thereafter compressing the walls of the slots upon said tape.

2. The herein described method of manipulating multiple fastener elements which consists in rigidly holding a plurality of such elements in alinement and in spaced relation with their bases exposed, cutting a channel in said bases, spreading the walls of said channel, and inserting a carrying tape in said channel while the elements are so rigidly held, and thereafter compressing the channel walls to cause them to grip the carrying tape.

3. The herein described method of manipulating fastener elements which consists in feeding such elements into the receiving spaces of an elongated holding member, clamping them therein with their bases exposed, slotting said bases while held by said member, and inserting a carrier tape in said slots, removing the assembled elements and strip from the holding member, and forcing the opposed walls of the channels towards each other to cause them to grip the tape.

4. The herein described method of manipulating fastener elements having bases provided with transverse openings which consists in assembling and rigidly holding a plurality of said elements with their openings in alignment and bases exposed, cutting a slot longitudinally of the row of elements in the bases thereof to intersect the openings, and threading the beaded edge of a carrying tape through the alined openings while the elements are so rigidly held, and thereafter compressing the opposed walls of the slot upon said tape.

5. The herein described method of manipulating fastener elements which consists in feeding said elements into a carrier bar, transferring them successively from the carrier bar to the receiving recesses of a holding bar, clamping them in the holding bar with their bases exposed, cutting longitudinally of the assembled elements to provide slots in said bases, spreading the walls of said slots, inserting a tape in said slots, and thereafter compressing the walls of the slots upon said tape.

6. The herein described method of manipulating fastener elements of the type described which consists in automatically feeding said elements to carrier bar, successively transferring the elements therefrom to a spacing bar, bifurcating the bases of the elements while so held, spreading the bifurcated portions, inserting a carrier tape therein, and compressing the bifurcated portions to clamp the tape.

7. The method of manipulating relatively small fastener elements consisting of slotting the bases of said fastener elements during their formation to receive and be clamped upon tapes while held in uniform spaced relation in a comb bar, characterized by placing a number of the elements en masse in a container, and automatically transferring them in series to a chute, and then mechanically transferring them in uniform spaced relation from the chute to the comb bar inserting a carrier tape between said bifurcated base portions and pressing said base portions together to hold the elements firmly on the tape.

8. The process of making fasteners of the type comprising a carrier strip and a plurality of individual fastening elements secured to the strip in spaced relation, which consists in forming fastener elements, placing a number of elements en masse in a container, mechanically transferring the elements in orderly arrangement from the container to a holder, forming the elements with bifurcated spread apart portions during the process, holding the elements with their bifurcated portions exposed and in spaced alignment, placing a carrier strip in the bifurcated portions, and pressing the bifurcated portions together to hold the elements firmly on the strip.

9. The method of manipulating fastener elements of the type which are bifurcated during their formation to receive and be clamped upon tapes, characterized by forming bifurcations in the elements and mechanically and automatically feeding said elements to a carrier bar, successively transferring said elements therefrom to the equidistant spaces of a comb bar, inserting a carrier tape in the bifurcations of the elements and compressing the bifurcated portions to clamp the elements to the tape.

10. The herein described method of manipulating multiple fastener elements which consists in placing a number of elements en masse in a container, manipulating the elements to deliver them in orderly arrangement to a receiver, transferring the elements while so arranged to the equidistant recesses of an elongated holding bar, forming in said elements bifurcated spaced apart base portions, which are in alinement when said elements are held in said bar, inserting a carrier tape between said bifurcated base portions and pressing said base portions together to hold the elements firmly on the tape.

JOSEPH E. PERRAULT.